Aug. 9, 1949.  J. W. SIMPSON  2,478,508
PIPE JOINT
Filed April 13, 1945

Inventor:
James W. Simpson,
By Cushman Darby & Cushman
Attorneys

Patented Aug. 9, 1949

2,478,508

UNITED STATES PATENT OFFICE 2,478,508

PIPE JOINT

James W. Simpson, Decatur, Ill., assignor to Mueller Co., Decatur, Ill., a corporation of Illinois Application April 13, 1945, Serial No. 588,097

1 Claim. (Cl. 285—105)

Figure 1:
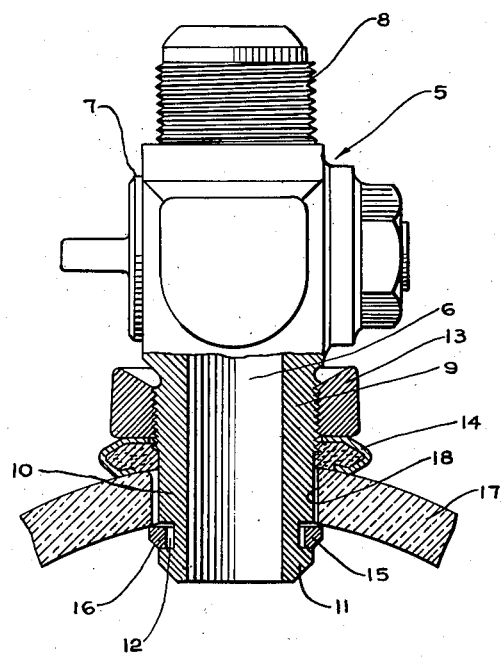
Figure 2:
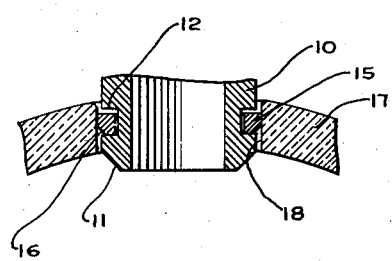

The present invention relates to corporation stops and method of installing the same and has as its purpose to provide for the installation without the necessity of equipping the stop and the main opening in which it is to be secured with the customary inter-engaging threads. In threading openings in mains made of "Transite" or similar plastic materials, taps quickly become dulled and, consequently, the present invention is applicable to particular advantages in the case of such mains, although not limited to such use. An installation in accordance with the invention is shown in the accompanying drawing, in which Figure 1 shows a portion of a main in transverse section, and, partly in longitudinal section and partly in elevation a stop at a certain installation stage, and Figure 2 is a view similar to that of Figure 1, showing the stop in a different installation stage.

The stop comprises an elongated body 5 provided with a longitudinal flow passage 6 intersected by a conical valve seat in which is engaged a conical valve plug 7. One end of the body is provided with threads 8 whereby the stop is adapted to be coupled to a service line.

The other end of the body is provided with a threaded portion 9 adjacent the plug and outwardly of the threaded portion with a neck portion 10 which is externally smooth. The extremity of the neck portion is bevelled at 11 and inwardly of the bevel is an external circumferential groove 12.

Engaged with the threaded portion 9 is a follower nut 13 for a gasket 14 which preferably frictionally engages the threads so as to be retained against dropping when the stop is suspended with the neck portion down. Reference numeral 15 designates a resilient split metal ring disposed in the groove 12 and having a normal diameter such that it projects outwardly of the groove, as shown in Figure 1. The ring has a flat top surface and a lower bevelled surface 16 which extends in to the lower edge of the groove.

Assuming that the main, designated at 17, contains a fluid under pressure, a drilling machine such for example as is shown in the patent to F. H. Mueller et al., No. 2,196,651, Sept. 22, 1942, is applied to the main and an opening 18 of slightly larger diameter than the neck portion 10 is drilled. The drill is then removed from the boring bar and replaced by a stop inserting tool such for example as is shown in patent to F. H. Mueller et al., No. 2,247,427, July 1, 1941, and the tool is engaged with the threads 8 of the closed stop. The boring bar is then lowered through the drilling machine barrel to insert the neck portion in the opening 18, being guided into the latter by the bevelled surface 11. As the stop is lowered, the bevelled surface 16 of ring 15 engages the top edge of the main opening so that as a result of the camming action the ring is contracted, as shown in Figure 2, so as to be able to pass through the opening. Nut 13 is so positioned on the threaded portion for abutment by the gasket 14 that somewhat before ring 15 clears the lower edge of the opening 18, the gasket will engage the top margin of the opening so as to be compressed by the time the ring clears the lower edge of the opening to expand to the locking relation shown in Figure 1. The operator pulls up on the boring bar to make sure that the ring has expanded to locking position and, if it has, he rotates the boring bar to release the tool from the stop, whereupon the drilling machine can be dismounted.

The compression of the gasket by the inserting operation thus described produces two results, (1) a seal is provided between the stop and the main, and (2) the stop is held against any tendency to rotate with the tool as the latter is being turned off. However, full compression of the gasket will not ordinarily be obtained during the inserting operation and after the drilling machine has been removed nut 13 is threaded downwardly to compress the gasket to the desired degree. The follower nut and gasket here shown follow the disclosure of the patent to J. W. Simpson, No. 2,265,703, December 9, 1941.

In the case of a main of plastic material, the tightening of nut 13 causes the sharp upper edge of ring 15 to bite into the lower margin of opening 18 to provide a secure seating, ring 15 being sufficiently powerful so that it will not be appreciably contracted by the upward pull, even in the case of the usual cast iron or steel main.

Variations in the form and arrangements of parts are contemplated as possible without departure from the invention as defined in the following claim.

I claim:

A coupling comprising an elongated body having a longitudinal flow passage, one end of said body having a threaded portion and a neck portion outwardly of said threaded portion adapted to be inserted through a lateral opening in a main, a nut engaged with said threaded portion, radially spring projected abutment means in said neck portion spaced from said threaded portion, said abutment means being bevelled so as to be cammed inwardly to enable the abutment means to pass through the main opening when said neck portion is pushed through the latter, the abutment means then springing outwardly to engage the inner margin of said opening, and a compressible resilient gasket retained on the body end between said nut and abutment means.

JAMES W. SIMPSON.

REFERENCES CITED

The following references are of record in the file of this patent:

UNITED STATES PATENTS

| Number | Name | Date |
|---|---|---|
| 945,517 | Goodwin | Jan. 4, 1910 |
| 1,599,098 | Mix | Sept. 27, 1926 |